UNITED STATES PATENT OFFICE.

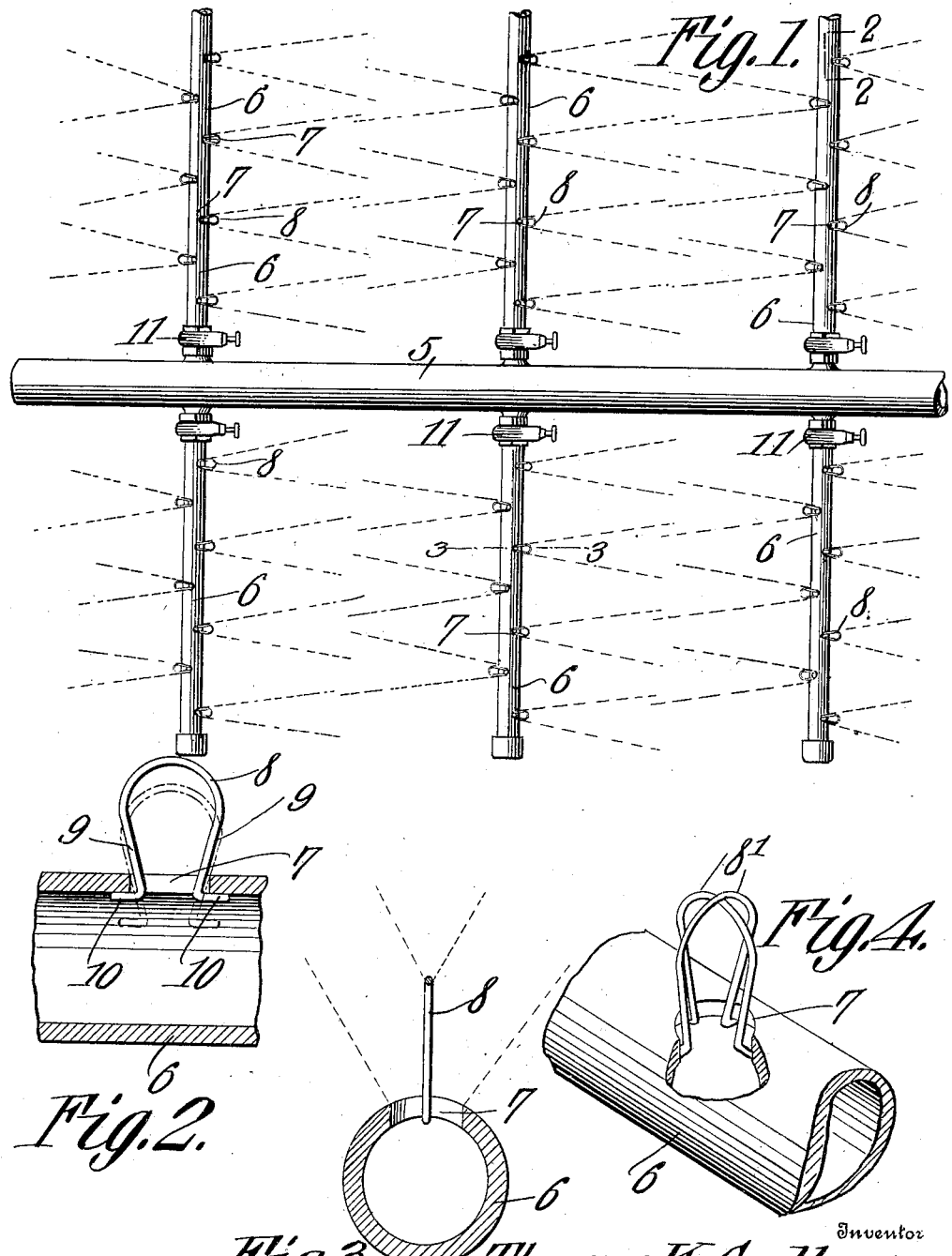

THOMAS K. GODBEY, OF WALDO, FLORIDA.

SYSTEM IRRIGATION AND SPRINKLER.

No. 890,044.  Specification of Letters Patent.  Patented June 9, 1908.

Application filed December 30, 1907. Serial No. 408,632.

*To all whom it may concern:*

Be it known that I, THOMAS K. GODBEY, a citizen of the United States, residing at Waldo, in the county of Alachua and State of Florida, have invented a new and useful System Irrigation and Sprinkler, of which the following is a specification.

This invention relates to irrigating systems and has for its object to provide a system in which the water is conducted from a pump or other suitable source of supply and distributed through a plurality of branch pipes over the surface of the land to be irrigated.

A further object of the invention is to form the branch pipes with discharge perforations or orifices having one or more spraying elements disposed within the same, which latter are kept in constant motion by the current of water flowing through the perforations thus serving to prevent the perforations from becoming clogged or otherwise obstructed by deposits of sand, dirt, and other foreign matter.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a plan view of an irrigating system constructed in accordance with my invention. Fig. 2 is an enlarged longitudinal sectional view taken on the line 2—2 of Fig. 1. Fig. 3 is a transverse sectional view taken on the line 3—3 of Fig. 1. Fig. 4 is a detail perspective view partly in section illustrating a modified form of the invention.

Similar numerals of reference indicate corresponding parts in all of the figures of the drawings.

The improved system forming the subject matter of the present invention is principally designed for irrigating lands or spraying growing vegetation and the like and in its preferred embodiment comprises a main pipe 5 communicating with a pump or other suitable source of water supply and provided with a plurality of lateral branch pipes 6 having perforations 7 formed therein through which the water is discharged over the surface of the land to be irrigated.

Slidably mounted in the perforations 7 are one or more spraying elements 8 each preferably formed of a single piece of wire bent into substantially U shape to produce spring arms 9 the terminals of which are bent laterally to form stop fingers 10 adapted to bear against the interior walls of the adjacent branch pipe thereby to limit the outward movement of the spraying elements.

The distance between the arms 9 at the stop shoulders 10 is less than the diameter of the discharge opening or perforation so as to permit the spraying element freely to move within the same without unnecessary friction between the parts.

It will thus be seen that the water flowing through the main supply pipe 5 and branch pipes 6 will be discharged through the orifices 7 and in coming in contact with the curved walls of the spraying elements will be divided and discharged over the surface of the land in the form of a film or spray, as best shown in Fig. 1 of the drawings. As the water comes in contact with the closed ends of the spraying elements the force of water will have a tendency to oscillate the spraying elements within the perforations thus keeping the latter in constant motion and preventing the perforations from becoming clogged or otherwise obstructed with deposits of sand, dirt and other foreign matter.

In using the sprayer the spring arms 9 are pressed inwardly with the fore-finger and thumb until the base of the stop fingers come in contact with each other and in which position the spraying element may be readily introduced within the adjacent perforation or orifice. As soon as the pressure on the arms 9 is released the spring of said arms 9 will force the fingers laterally in engagement with the interior walls of the conductor adjacent the orifice and in which position the sprayer will be effectually locked against accidental displacement. It will here be noted that when the water from the pump is cut off the spraying elements will drop by gravity to the dotted line position shown in Fig. 2 of the drawings and when the water is admitted to the main pipe the pressure of the water will lift the spraying elements to the full line position shown in said figure, thereby to assist in maintaining the perforations free from obstructions.

The spraying elements 8 not only serve to divide or separate the water but also serve to regulate the quantity discharged from the branch pipes.

Suitable gate valves 11 are preferably disposed at the juncture of the main and branch pipes for controlling the flow of water through the latter.

In Fig. 4 of the drawings there is illustrated a modified form of the invention in which a plurality of spraying elements 8' are employed, the spraying elements being arranged at substantially right angles to each other with the closed end of one element disposed in contact with the closed end of the adjacent element, the spring arms of the spraying elements being loosely mounted in the adjacent perforations or orifices in the manner before stated so as to permit free movement of the same by the action of the water.

It will of course be understood that any number of spraying members may be inserted in the different discharge orifices, the number of spraying elements inserted in each orifice regulating the quantity of liquid discharged over the surface of the land to be irrigated.

While the system herein shown and described is principally designed for irrigation purposes it is obvious that the same may be installed in buildings and used with equally good results for extinguishing fires or wherever a device of this character is found desirable.

Having thus described the invention what is claimed is:

1. In water distribution, a perforated fluid conductor, and substantially U shaped spraying elements loosely mounted in the perforations and provided with spring arms terminating in laterally extending stop fingers adapted to bear against the interior walls of the conductor, said spraying elements being kept in constant motion by the flow of fluid through the perforations.

2. In water distribution, a perforated fluid conductor, and substantially U shaped spraying elements, circular in cross section, loosely mounted in the perforations and provided with terminal stops adapted to bear against the interior walls of the conductor for limiting the outward movement of the spraying elements, said spraying elements being kept in constant motion by the flow of fluid through the perforations.

3. In water distribution, a perforated fluid conductor, and spraying elements loosely mounted in said perforations and each formed of a single piece of wire bent into substantially U shape to form converging spring arms terminating in laterally extending stop fingers adapted to bear against the interior walls of the conductor, said spraying elements being kept in constant motion by the flow of fluid through the perforations.

4. In water distribution, a perforated fluid conductor, and spraying elements loosely mounted in the perforations in said conductor and each formed of a single piece of wire bent to form converging spring arms terminating in laterally extending stop fingers adapted to bear against the interior walls of the conductor for limiting the outward movement of the spraying elements, the distance between the arms being less than the diameter of the perforations whereby the spraying elements are kept in constant motion by the flow of fluid through the perforations.

5. In water distribution, a main supply pipe, perforated branch pipes communicating therewith, spraying elements loosely mounted in said perforations and each formed of a single piece of wire bent into substantially inverted U shape to form spring arms terminating in laterally extending stop fingers adapted to bear against the interior walls of the branch pipes, said spraying elements being kept in constant motion by the flow of fluid through the perforations in the branch pipes, and means for controlling the flow of fluid from the supply pipe to said branch pipes.

In testimony that I claim the foregoing as my own, I have hereto affixed my signature in the presence of two witnesses.

THOMAS K. GODBEY

Witnesses:
 B. W. TILLIS,
 T. B. TILLIS.